US008871354B2

(12) United States Patent
Imai et al.

(10) Patent No.: US 8,871,354 B2
(45) Date of Patent: Oct. 28, 2014

(54) COPPER-BASED SLIDING MATERIAL

(75) Inventors: Takuo Imai, Inuyama (JP); Kouji Zusi, Inuyama (JP); Kentaro Tujimoto, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 258 days.

(21) Appl. No.: 13/033,144

(22) Filed: Feb. 23, 2011

(65) Prior Publication Data
US 2011/0206939 A1    Aug. 25, 2011

(30) Foreign Application Priority Data
Feb. 23, 2010    (JP) .................................. 2010-037854

(51) Int. Cl.
| B22F 7/04 | (2006.01) |
| C22C 9/00 | (2006.01) |
| F16C 33/12 | (2006.01) |
| C22C 32/00 | (2006.01) |
| B32B 15/01 | (2006.01) |

(52) U.S. Cl.
CPC .................. C22C 9/00 (2013.01); F16C 33/121 (2013.01); B22F 2303/40 (2013.01); B22F 2303/405 (2013.01); B22F 2998/10 (2013.01); C22C 32/0047 (2013.01); B32B 15/013 (2013.01)
USPC ........... 428/553; 428/564; 384/276; 148/432; 148/433; 148/435; 420/470; 420/472; 420/473; 420/485; 420/499; 75/246; 75/247

(58) Field of Classification Search
None
See application file for complete search history.

(56) References Cited

U.S. PATENT DOCUMENTS

| 6,334,914 | B2 * | 1/2002 | Sakai et al. ................... 148/433 |
| 7,678,173 | B2 | 3/2010 | Yokota et al. | |
| 2001/0021353 | A1 * | 9/2001 | Sakai et al. ................... 420/470 |
| 2008/0095658 | A1 * | 4/2008 | Yokota et al. ................. 420/472 |
| 2011/0129173 | A1 * | 6/2011 | Yokota et al. ................... 384/42 |

FOREIGN PATENT DOCUMENTS

| EP | 2166117 A1 | 3/2010 |
| GB | 2355016 A | 4/2001 |
| JP | 4-28836 A | 1/1992 |

(Continued)

OTHER PUBLICATIONS

Office Action issued in copending Korean Application No. 10-2011-0097653 dated Nov. 8, 2012 (four pages).

*Primary Examiner* — Mark Ruthkosky
*Assistant Examiner* — Daniel J Schleis
(74) *Attorney, Agent, or Firm* — Browdy and Neimark, PLLC

(57) ABSTRACT

Provided is a copper-based sliding material including a steel back-metal layer and a Cu alloy layer. The Cu alloy layer contains, by mass %, 10 to 30% of Bi, 0.5 to 5% of an inorganic compound, and the balance being Cu and inevitable impurities. The Cu alloy layer may further contain 0.5 to 5% of Sn and/or at least one element selected from the group consisting of Ni, Fe, P and Ag in a total amount of 0.1 to 10%. The inorganic compound has an average particle size of 1 to 5 μm and a specific gravity of 70 to 130% relative to the specific gravity of Bi. Bi phase is formed in the Cu alloy layer in an average particle size of 2 to 15 μm, and the Bi phase is dispersed in the Cu alloy layer and isotropic.

4 Claims, 6 Drawing Sheets

(56) References Cited

FOREIGN PATENT DOCUMENTS

| | | |
|---|---|---|
| JP | 5-263166 A | 10/1993 |
| JP | 2001-081523 | 9/1999 |
| JP | 3421724 B2 | 4/2003 |
| JP | 2005-200703 A | 7/2005 |
| KR | 10-0814656 | 3/2008 |
| KR | 10-2011-0097653 | 8/2011 |
| WO | 2008140100 A1 | 11/2008 |

* cited by examiner

COPPER-BASED SLIDING MATERIAL

TECHNICAL FIELD OF THE INVENTION

The present invention relates to a copper-based sliding material having excellent fatigue resistance, and in particular a copper-based sliding material suitable for a sliding bearing material used in an internal combustion engine.

BACKGROUND OF THE INVENTION

Conventionally, a copper-based sliding material for use in a sliding bearing for an internal combustion engine has been generally manufactured by a continuous sintering process. In the continuous sintering process, a Cu alloy powder is continuously scattered onto a steel strip and then sintered and rolled in series. The copper-based sliding material for a sliding bearing has been required to be free of lead (Pb) in order to meet recent environmental restrictions, and thus a sintered Cu alloy containing bismuth (Bi) in place of Pb has been proposed (see, for example, JP-B2-3421724, JP-A-2005-200703, JP-A-04-28836 and JP-A-05-263166).

A crankshaft of an internal combustion engine tends to be rotated at a higher speed. Accordingly, a sliding bearing has been required to have higher seizure resistance. When the above sintered Cu alloy containing Bi is used as a copper-based sliding material for a sliding bearing, the sintered Cu alloy desirably contains Bi in an amount of not less than 10 mass % in order to obtain the high seizure resistance.

Furthermore, an internal combustion engine has been recently made lightweight. Thus, the weights of an engine block and a connecting rod have been reduced and the rigidity of a bearing housing for supporting a cylindrical sliding bearing has been lowered. Such a bearing housing elastically deforms during operation of the internal combustion engine. The sliding bearing fixed in the bearing housing is subjected to a dynamic load vertically applied to the sliding surface of the sliding bearing from a crankshaft. In addition, tensile and compressive stress are repeatedly applied to the bearing in a circumferential direction. For the reason, the sliding bearing is necessary to have high strength in the circumferential direction as well.

JP-B2-3421724 and JP-A-2005-200703 disclose that a Cu alloy containing Bi is sintered in a continuous sintering process. However, it greatly depends on the Bi content whether the sintered Cu alloy has high strength or not. More specifically, as shown in FIGS. 7A and A', when a Cu alloy powder 4 was scattered onto a steel strip, many spaces are present in the Cu alloy powder layer 2. When a temperature is raised in a primary sintering step thereafter, Bi melts into a liquid phase 3' at about 270° C., and then flows out from the Cu alloy powder particles 4 into the spaces between the powder particles 4, as shown in FIGS. 7B and B'. At this time, the Cu alloy powder particles 4 are not sufficiently sintered, and they are not sufficiently bonded. Therefore, Bi in the spaces between the Cu powder particles 4 spreads along the surfaces of the Cu alloy powder particles 4, as shown in FIG. 7C. As a result, the Bi phase 3 in the Cu alloy layer 2 becomes coarse, as shown in FIG. 6. This is significant in the case where Bi is contained in the Cu alloy layer 2 in an amount of not less than 10 mass %. Since the Bi phase 3 rarely solid-solute in the Cu phase, it presents by itself in the Cu alloy layer 2. Furthermore, the Bi phase 3 has strength significantly lower than that of the Cu phase. Since a dynamic load is applied on the bearing, a crack is likely to be developed from the coarse Bi phase 3 or the grain boundary between the Bi phase 3 and the Cu phase, possibly resulting in fatigue breakdown of the Cu alloy layer 2.

On the other hand, JP-A-04-28836 describes that a copper-based sliding material having fine Bi phase can be obtained when a Bi-containing Cu alloy powder is produced by a mechanical alloying process and sintered at a relatively low temperature (400 to 800° C., more preferably, 400 to 700° C.) However, when sintering is performed at a temperature of not higher than 800° C. in a continuous sintering process, a steel back-metal and a Cu alloy layer cannot be sufficiently bonded. As a result, fatigue resistance decreases. On the other hand, when sintering is performed at a temperature above 800° C., the Cu alloy powder is excessively sintered although the Cu alloy layer and the steel back-metal are sufficiently bonded. Thus, the Bi phase in the Cu alloy layer becomes coarse, as described in JP-A-05-263166,

SUMMARY OF THE INVENTION

The present invention has been made in view of the aforementioned circumstances. An object of the present invention is to suppress coarsening of a Bi phase in a Cu alloy layer produced by a continuous sintering process and to provide a copper-based sliding material having excellent fatigue resistance.

To attain the above object, according to an aspect of the present invention, there is provided a copper-based sliding material comprising a steel back-metal layer and a Cu alloy layer. The Cu alloy layer consists of: 10 to 30 mass % of Bi; 0.5 to 5 mass % of an inorganic compound; optionally 0.5 to 5 mass % of Sn; optionally at least one element selected from the group consisting of Ni, Fe, P and Ag in a total amount of 0.1 to 10 mass %; and the balance being Cu and inevitable impurities. The inorganic compound has an average particle size of 1 to 5 μm and a specific gravity of 70 to 130% relative to the specific gravity of Bi. Bi phase is formed in the Cu alloy layer and has an average particle size of 2 to 15 μm, and the Bi phase is dispersed in the Cu alloy layer and the Bi phase is isotropic.

The inorganic compound preferably has a specific gravity of 90 to 110% relative to the specific gravity of Bi.

The inorganic compound is preferably a carbide, nitride or silicide of a metal.

BRIEF DESCRIPTION OF DRAWINGS

FIG. 2A' is an enlarged schematic illustration of FIG. 2A;

FIG. 2B' is an enlarged schematic illustration of FIG. 2B;

FIG. 7A' is an enlarged schematic illustration of FIG. 7A;

FIG. 7B' is an enlarged schematic illustration of FIG. 7B;

DETAILED DESCRIPTION OF THE INVENTION

The copper-based sliding material according to the present invention has an excellent sliding property since the Cu alloy layer contains 10 to 30 mass % of Bi. If the Bi content is less than 10 mass %, excellent seizure resistance cannot be obtained. On the other hand, if the Bi content is above 30 mass %, the strength of the Cu alloy layer decreases.

Figure 1:
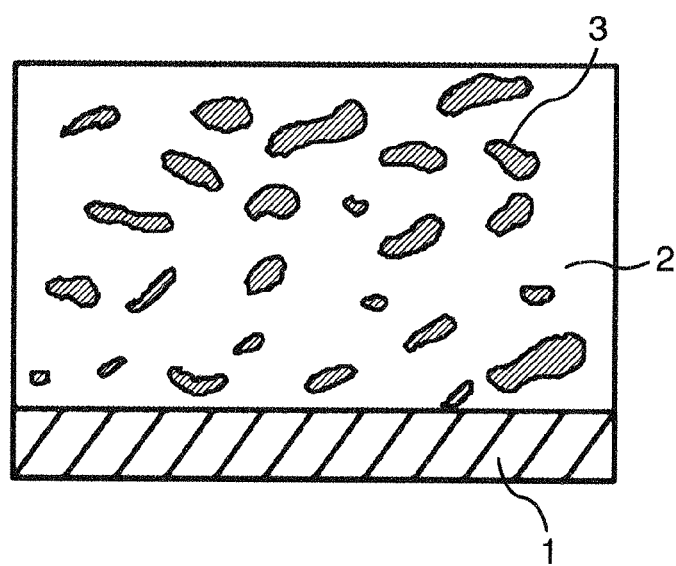
FIG. 1 is a schematic illustration showing a structure of a Cu alloy layer containing an inorganic compound, according to an embodiment of the invention.
Figure 2C:
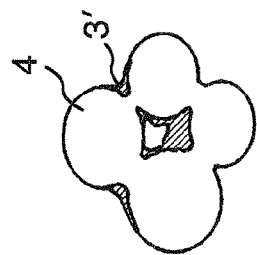
FIG. 2C is a schematic illustration showing a primary sintering step at 800° C. according to an embodiment of the invention for explaining coarsening mechanism of a Bi phase in a step of producing a Cu alloy layer containing an inorganic compound.
Figure 2B:
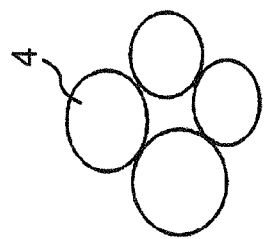
FIG. 2B is a schematic illustration showing a primary sintering step at 300-700° C. according to an embodiment of the invention for explaining coarsening mechanism of a Bi phase in a step of producing a Cu alloy layer containing an inorganic compound.
Figure 2B:
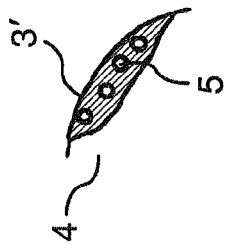
Figure 2A:
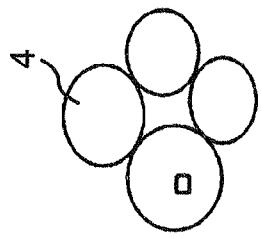
FIG. 2A is a schematic illustration showing a powder scattering step according to an embodiment of the invention for explaining coarsening mechanism of a Bi phase in a step of producing a Cu alloy layer containing an inorganic compound.
Figure 2A:
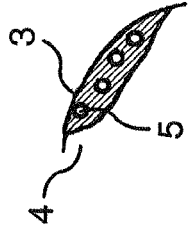
Figure 2D:
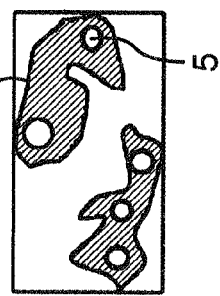
FIG. 2D is an enlarged schematic illustration of squared area indicated in FIG. 2A.

The Cu alloy layer contains an inorganic compound having an average particle size of 1 to 5 μm, which can make an effect of suppressing coarsening of the Bi phase in the Cu alloy layer. The reasons thereof are considered as follows. As shown in the enlarged view of FIG. 2A', a Bi phase 3 having a size larger than the particle size of the inorganic compound 5 within the range of the invention is present on a surface of a Cu alloy powder 4 produced by an atomizing process. Steps of producing the powder include a step of mixing a Cu alloy powder and an inorganic compound. The fine inorganic compound 5 of 1 to 5 μm is embedded in a soft Bi phase 3 during the mixing step. Furthermore, as shown in FIGS. 2A and 2A', many spaces are present in the Cu alloy powder layer 2 when the Cu alloy powder 4 is scattered onto a steel strip as described above. If the inorganic compound 5 is not embedded in the Bi phase 3 on the surface of the Cu alloy powder particle 4, Bi melts at about 270° C. into a liquid phase 3' when a temperature is raised in a primary sintering step, and then flows out from the Cu alloy powder particles 4 into the spaces between the particles 4. At this time, the Cu alloy powder particles 4 are not sufficiently sintered and are not sufficiently bonded. Therefore, Bi flows out into the spaces and spreads along the surfaces of the Cu alloy powder particles 4. As a result, the Bi phase 3 in the Cu alloy layer 2 becomes coarse. However, in the case where the inorganic compound 5 is embedded in the Bi phase 3 on the surface of the Cu alloy powder particles 4, liquid Bi phase 3' can be held in the Cu alloy powder particles 4 up to the temperature at which the Cu alloy powder particles 4 are sufficiently sintered, as shown in FIGS. 2B and 2B'. As a result, the Bi liquid phase 3' no longer spreads as shown in FIG. 2C, and thereafter rolling and sintering are repeated to obtain a Cu alloy layer 2 having Bi phases 3 finely dispersed therein as shown in FIG. 1.

At this time, when an average particle size of the inorganic compound 5 is above 5 μm, it is difficult to embed the inorganic compound 5 in the Bi phase 3 on the surface of a Cu alloy powder particle 4, with the result that the size of the Bi phase 3 cannot be reduced. Furthermore, smaller average particle size of the inorganic compound 5 is more preferable, in view of formation of fine Bi phase 3. However, an inorganic compound 5 smaller than 1 μm is expensive and will increase the price of the copper-based sliding material.

Furthermore, the inorganic compound 5 contained in the Cu alloy layer 2 has a specific gravity of 70 to 130% relative to a specific gravity of Bi, which produces an effect of finely dispersing the Bi phase 3 in the Cu alloy layer 2. The reasons thereof are considered as follows. In the sintering step, Bi in the Cu alloy powder particle 4 melts into a liquid phase. As described above, liquid Bi phase is present together with an inorganic compound 5. In this case, if the inorganic compound 5 having a specific gravity close to that of Bi is selected, the inorganic compound 5 is dispersed in the liquid-phase Bi without aggregation. As a result, the liquid-phase Bi can be held in Cu alloy powder particles 4. Through the above mechanism, Bi in the Cu alloy layer 2 can have reduced size. In this way, excellent fatigue resistance can be obtained.

Furthermore, the inorganic compound 5 may include a carbide, a nitride, a silicide and a boride. The carbide may include NbC, $Mo_2C$, WC—TiC and WC—TiC—TaC. The nitride may include ZrN, $Mo_2N$ and NbN. The silicide may include $TaSi_2$ and $WSi_2$. The boride may include MoB and $TaB_2$ etc.

Figure 3:
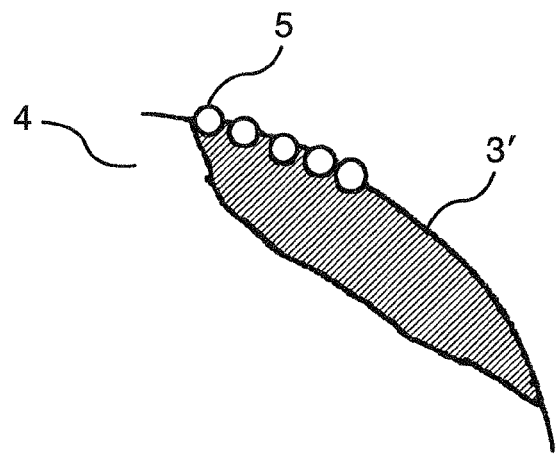
FIG. 3 is a cross sectional view showing the state of an inorganic compound having a light specific gravity on the surface of a Cu alloy powder, according to comparative embodiment.
Figure 4:
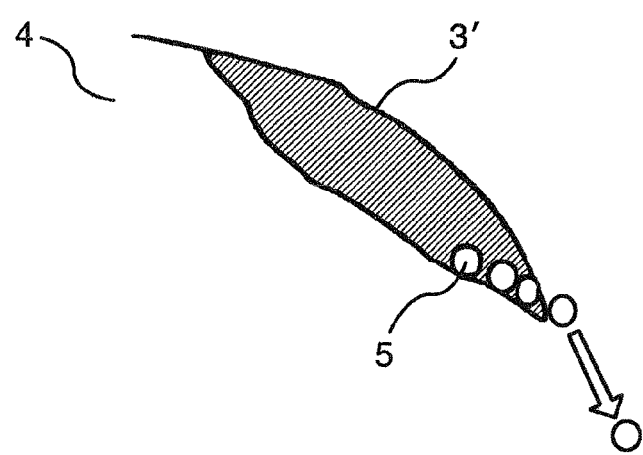
FIG. 4 is a cross sectional view showing the state of an inorganic compound having a heavy specific gravity on the surface of a Cu alloy powder, according to comparative embodiment.

When the specific gravity of the inorganic compound 5 is less than 70% in relation to the specific gravity of Bi, the inorganic compound 5 aggregates at the upper portion of the liquid Bi phase, as shown in FIG. 3. On the other hand, when the specific gravity of the inorganic compound 5 is above 130% in relation to the specific gravity of Bi, the inorganic compound 5 falls out from the liquid Bi phase and aggregates at the lower portion of the Cu alloy layer 2, as shown in FIG. 4. As a result, the effect of suppressing coarsening of the Bi phase 3 in the Cu alloy layer 2 is small, and fatigue resistance decreases.

Furthermore, the inorganic compound 5 is contained in the Cu alloy layer 2 in a range of 0.5 to 5 mass % to improve the balance between the amount of the Bi phases 3 and the amount of the inorganic compound 5 in the Cu alloy layer 2. Therefore, an effect of suppressing coarsening of the Bi phase 3 in the Cu alloy layer 2 is obtained. Further preferably, the content ratio of Bi/the inorganic compound may be 4 to 10, thereby coarsening of the Bi phase 3 can be more sufficiently suppressed.

In this case, if the content of the inorganic compound 5 is less than 0.5 mass %, the effect of suppressing coarsening of the Bi phase 3 is small and excellent fatigue resistance cannot be obtained. On the other hand, if the content of the inorganic compound 5 is above 5 mass %, the inorganic compound 5 is locally aggregated in the Cu alloy layer 2 and fatigue resistance decreases.

From the above, fine Bi phases 3 having an average particle size of 2 to 15 μm is dispersing while not less than 10 mass % of Bi is contained in the Cu alloy layer 2, thereby excellent fatigue resistance is attained.

It is presumed that smaller average particle size of the Bi phase 3 is preferable. By the experiments, it was confirmed that excellent fatigue resistance can be obtained for the average particle size of the Bi phase 3 of not less than 2 μm. Furthermore, when the average particle size of the Bi phase 3 is more than 15 μm, fatigue resistance decreases.

Figure 5A:
FIG. 5A is a top view of a sliding bearing half.
Figure 5B:
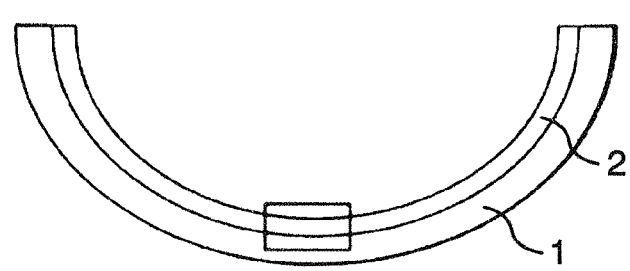
FIG. 5B is a cross sectional view of the sliding bearing half of FIG. 5A in a circumferential direction.
Figure 5C:
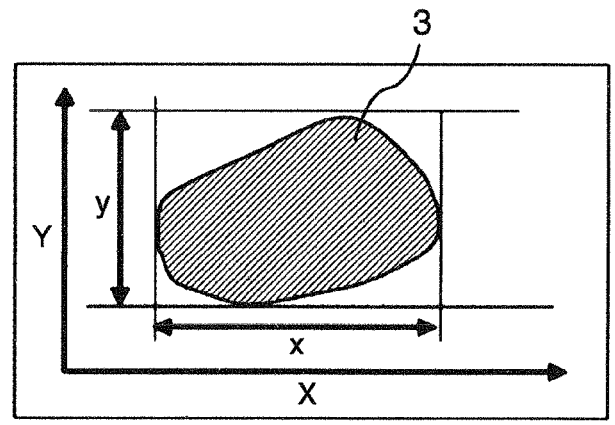
FIG. 5C is an enlarger view indicated by the square of FIG. 5B and for explaining an isotropy (x/y) of a Bi phase in a Cu alloy layer.
Figure 6:
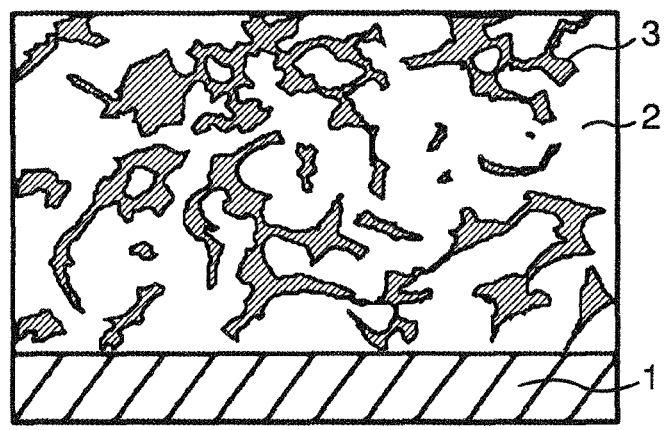
FIG. 6 is a schematic illustration showing a structure of a Cu alloy layer without an inorganic compound, according to the prior art.
Figure 7A:
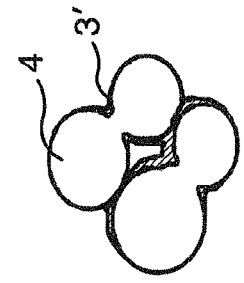
FIG. 7A is a schematic illustration showing a powder scattering step according to the prior art for explaining coarsening of a Bi phase in a step of producing a Cu alloy layer without an inorganic compound.
Figure 7B:
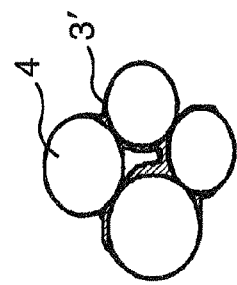
FIG. 7B is a schematic illustration showing a primary sintering step at 300-700° C. according to the prior art for explaining coarsening of a Bi phase in a step of producing a Cu alloy layer without an inorganic compound.
Figure 7A:
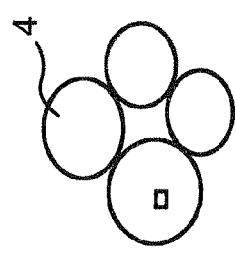
Figure 7C:
FIG. 7C is a schematic illustration showing a primary sintering step at 800° C. according to the prior art for explaining coarsening of a Bi phase in a step of producing a Cu alloy layer without an inorganic compound.
Figure 7B:
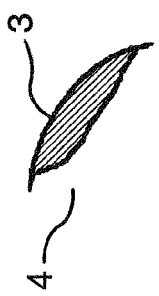
Figure 7D:
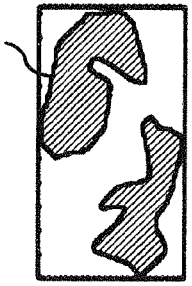
FIG. 7D is an enlarged schematic illustration of squared area indicated in FIG. 7A.

When the Bi phase 3 in the Cu alloy layer 2 has isotropy, fatigue resistance is improved. In the present invention, the isotropy is defined as follows. Y axis is taken along a thickness direction of the bearing alloy (the Cu alloy layer 2), and X axis is taken along a direction perpendicular to the thickness direction. The Bi phase 3 is defined to be isotropic if an average value of x/y is 1 to 2, where an average length in the X axis direction of the Bi phase is defined as x, and an average length in the Y axis direction thereof is defined as y, as shown in FIG. 5C.

As described above, Bi melts into a liquid phase in the sintering step. Liquid Bi phase flows out along the surface of a Cu alloy powder particle 4 before the Cu alloy powder particles 4 are sufficiently sintered. The liquid Bi phase flows by its weight through the spaces toward the lower portion of the Cu alloy layer 2, and thereafter the liquid Bi phase flows merge with each other. Consequently, the Bi phase 3 in the Cu alloy layer 2 is likely to form a shape elongated in the Y axis direction. However, since the inorganic compound 5 is embedded in the Bi phase 3 on the surface of Cu alloy powder particle 4, liquid Bi phase can be held in the Cu alloy powder particle 4 until the Cu alloy powder particle 4 are sufficiently sintered, by the above mechanism. Thus, liquid Bi phase does not flow toward the lower portion of the Cu alloy layer and the Bi phase 3 in the Cu alloy layer 2 has isotropy. Since the Bi phase 3 is isotropic, development of cracks from the Bi phase 3 can be suppressed and thus fatigue resistance is improved. Furthermore, since isotropy is determined within the range of 1 to 2, the longitudinal direction of the Bi phase 3 is consistent with the direction along which repeated tensile and compressive load is applied in the circumferential direction of the bearing. Thus, excellent fatigue resistance in the circumferential direction of the bearing can be attained.

When the average of x/y of the Bi phase 3 is less than 1, the direction of the longitudinal axis of the Bi phase 3 becomes perpendicular to the circumferential direction of the bearing along which repeated tensile and compressive load is applied. Thus, fatigue resistance in the circumferential direction of the bearing decreases. Furthermore, when the average of x/y of the Bi phase 3 is larger than 2, a crack is likely to be developed from the Bi phase 3 when a load is vertically applied. As a result, fatigue resistance decreases.

Furthermore, the inorganic compound 5 contained in the Cu alloy layer 2 of the copper-based sliding material may have a specific gravity of 90 to 110% in relation to the specific gravity of Bi. Thereby, the effect of finely dispersing Bi phase 3 in the Cu alloy layer 2 is more significantly obtained. This is presumed because the inorganic compound 5 is more uniformly dispersed in the liquid Bi phase, and thereby the effect of holding the liquid Bi phase in the Cu alloy powder can be improved.

The inorganic compound 5 may include a carbide, a nitride and a silicide. The carbide may include $Mo_2C$ and WC—TiC—TaC. The nitride may include $Mo_2N$. The silicide may include $TaSi_2$ and $WSi_2$ etc.

Furthermore, the Cu alloy layer may contain 0.5 to 5 mass % of Sn in order to obtain high strength of the Cu alloy layer 2. If the Cu alloy layer contains less than 0.5 mass % of Sn, the effect of strengthening the Cu alloy layer 2 is insufficient. If more than 5 mass % of Sn is added to the Cu alloy layer 2, the Bi phase 3 in the Cu alloy layer 2 becomes coarse. When the Cu alloy powder containing Sn is sintered, a Cu—Sn liquid phase is partly produced on the surface of the Cu alloy powder particle 4. However, if more than 5 mass % of Sn is contained, the amount of the Cu—Sn liquid phase becomes excessively large, and the Cu—Sn liquid phase flows on the surface of the Cu alloy powder particle 4. Consequently, the inorganic compound 5, which has been embedded in the Bi phase 3 on the surface of the Cu alloy powder particle 4, is flushed out with the Cu—Sn liquid phase. Therefore, an effect of suppressing coarsening of the Bi phase 3 in the Cu alloy layer 2 decreases.

Furthermore, the Cu alloy layer 2 may contain at least one element selected from the group consisting of Ni, Fe, P and Ag in a total amount of 0.1 to 10 mass %, in order to obtain high strength. When the total amount of the element or elements is less than 0.1 mass %, the effect of strengthening the Cu alloy layer 2 is insufficient. Furthermore, when the total amount of the element or elements is above 10 mass %, the Cu alloy layer becomes fragile, and thus fatigue resistance decreases.

EXAMPLES

Examples 1 to 18 of a Bi-containing Cu alloy according to an embodiment of the invention, and Comparative Examples 21 to 30 were measured with the average particle size of a Bi phase and subjected to a bearing fatigue test. Table 1 shows compositions of Examples 1 to 18 and Comparative Examples 21 to 30. As for Examples 1 to 18, a Cu alloy powder was produced by an atomizing process and mixed with an inorganic compound with use of a general mixer. In this way, the inorganic compound was embedded in the Bi phase on a surface of the Cu alloy powder particle so as to satisfy the component ratio in Table 1. Subsequently, the powder mixture was scattered onto a steel strip and subjected to repeated sintering and rolling processes to produce a sliding material. The sintering was performed at a temperature of 850° C. The sliding material was formed into a semi-cylindrical shape to produce a sliding bearing.

TABLE 1

| | | Alloy composition (% by mass) | | | | Content (% by mass) | Kind of Inorganic compound | Inorganic compound | | Inorganic compound specific gravity/Bi specific gravity (%) | Average particle size (μm) | Bi phase in Cu alloy layer | | Fatigue resistance (MPa) |
|---|---|---|---|---|---|---|---|---|---|---|---|---|---|---|
| | | | | | | | | Specific gravity (g/cm3) | | | | Average particle size (μm) | Isotropic index (X/Y) | |
| | No | Cu | Bi | Sn | Others | | | | | | | | | |
| Example | 1 | rem. | 20 | — | — | 2.8 | MoB | 8.67 | 88% | 3 | 5.36 | 1.68 | 70 |
| | 2 | rem. | 10 | — | — | 2.8 | MoB | 8.67 | 88% | 3 | 4.31 | 1.48 | 75 |
| | 3 | rem. | 30 | — | — | 2.8 | MoB | 8.67 | 88% | 3 | 8.71 | 1.74 | 55 |
| | 4 | rem. | 20 | — | — | 0.5 | MoB | 8.67 | 88% | 3 | 9.06 | 1.79 | 55 |

TABLE 1-continued

| | No | Cu | Bi | Sn | Others | Content (% by mass) | Kind of Inorganic compound | Specific gravity (g/cm3) | Inorganic compound specific gravity/Bi specific gravity (%) | Average particle size (μm) | Bi phase in Cu alloy layer Average particle size (μm) | Isotropic index (X/Y) | Fatigue resistance (MPa) |
|---|---|---|---|---|---|---|---|---|---|---|---|---|---|
| | 5 | rem. | 20 | — | — | 5 | MoB | 8.67 | 88% | 3 | 4.95 | 1.62 | 70 |
| | 6 | rem. | 20 | — | — | 2.8 | MoB | 8.67 | 88% | 1 | 4.67 | 1.61 | 75 |
| | 7 | rem. | 20 | — | — | 2.8 | MoB | 8.67 | 88% | 5 | 7.73 | 1.71 | 60 |
| | 8 | rem. | 10 | — | — | 2.5 | WSi2 | 9.86 | 101% | 1 | 2.27 | 1.39 | 85 |
| | 9 | rem. | 30 | — | — | 0.5 | WC—TiC | 6.92 | 71% | 5 | 14.81 | 1.92 | 50 |
| | 10 | rem. | 20 | — | — | 2.8 | WC—TiC | 6.92 | 71% | 3 | 7.21 | 1.74 | 60 |
| | 11 | rem. | 20 | — | — | 2.8 | TaB2 | 12.62 | 129% | 3 | 7.95 | 1.78 | 60 |
| | 12 | rem. | 20 | — | — | 2.8 | WSi2 | 9.86 | 101% | 3 | 4.67 | 1.35 | 80 |
| | 13 | rem. | 20 | — | — | 2.8 | TaSi2 | 9.1 | 93% | 3 | 4.71 | 1.43 | 75 |
| | 14 | rem. | 20 | — | — | 2.8 | WC—TiC—TaC | 10.53 | 107% | 3 | 4.82 | 1.41 | 75 |
| | 15 | rem. | 20 | 3.25 | — | 2.8 | Mo2C | 9.18 | 94% | 3 | 6.14 | 1.73 | 80 |
| | 16 | rem. | 20 | 0.5 | — | 2.8 | MoB | 8.67 | 88% | 3 | 5.41 | 1.69 | 75 |
| | 17 | rem. | 20 | 5 | — | 2.8 | MoB | 8.67 | 88% | 3 | 14.67 | 1.89 | 60 |
| | 18 | rem. | 20 | — | Ni: 7%, Fe: 0.5%, Ag: 2%, P: 0.1% | 2.8 | MoB | 8.67 | 88% | 3 | 5.43 | 1.7 | 80 |
| Comparative Example | 21 | rem. | 20 | — | — | — | — | — | — | — | 7.21 | 2.59 | 20 |
| | 22 | rem. | 20 | — | — | — | — | — | — | — | 19.67 | 2.67 | 30 |
| | 23 | rem. | 20 | — | — | 5 | MoB | 8.67 | 88% | 30 | 19.29 | 0.42 | 20 |
| | 24 | rem. | 40 | — | — | 2.8 | MoB | 8.67 | 88% | 3 | 20.11 | 2.57 | 20 |
| | 25 | rem. | 20 | — | — | 0.2 | MoB | 8.67 | 88% | 3 | 19.18 | 2.24 | 25 |
| | 26 | rem. | 20 | — | — | 7 | MoB | 8.67 | 88% | 3 | 5.12 | 1.66 | 40 |
| | 27 | rem. | 20 | — | — | — | — | — | — | — | 23.58 | 0.34 | 15 |
| | 28 | rem. | 20 | — | — | 2.8 | AlN | 3.3 | 34% | 3 | 18.71 | 2.11 | 35 |
| | 29 | rem. | 20 | — | — | 2.8 | WB | 15.73 | 161% | 3 | 16.59 | 2.04 | 40 |
| | 30 | rem. | 20 | 5 | — | 2.8 | MoB | 8.67 | 88% | 15 | 18.13 | 0.55 | 25 |

For Comparative Examples 21 and 22, a Cu alloy powder was produced by the mechanical alloying process so as to satisfy a component ratio shown in Table 1. The produced powder was scattered on a steel strip and subjected to sintering and rolling repeatedly to produce a sliding material. The sintering was performed at a temperature of 700° C. for Comparative Example 21 and 850° C. for Comparative Example 22. The sliding material was processed into a semi-cylindrical shape to produce a sliding bearing.

For Comparative Examples 23 to 26 and 28 to 30, sliding bearings were produced in the same manner as the above Examples so as to satisfy the component ratios shown in Table 1. For Comparative Example 27, a Cu alloy powder was produced by the atomizing process so as to satisfy the component ratio shown in Table 1 and a sliding bearing was produced in the same manner as the above Examples.

Next, the produced sliding bearings were measured to obtain average particle sizes of Bi phases by photographing compositional images of cross sections of the bearings in the circumferential direction at 200 fold magnification with an electron microscope. Concretely, the average particle size of the Bi phase was obtained by measuring the areas of individual Bi phase with a general image analysis method (analysis software Image-ProPlus (Version4.5) manufactured by Planetron, Inc.) and converting the area to an average diameter assuming that the individual Bi phase each forms a spherical shape. Furthermore, the isotropic index of the Bi phase was obtained from the above compositional image with use of the same analysis software as follows. The thickness direction of the cross section in the circumferential direction of the bearing is taken as Y axis, whereas the direction perpendicular to the Y axis is taken as X axis. The length y of each Bi phase along the Y axis and the length x along the X axis were measured and a ratio x/y of average length x to average length y was calculated.

Table 2 shows test conditions of fatigue test of the bearings. Examples 1 to 18 and Comparative Examples 21 to 30 were subjected to fatigue test by a bearing tester in the conditions applying a dynamic load vertically on the sliding surface of the bearing and tensile stress and compressive stress repeatedly in the circumferential direction.

TABLE 2

| Item | Condition |
|---|---|
| Test time | 30 hr |
| Rate | 18 m/min |
| Lubricant oil | SAE#30 |
| Oil supply temperature | 120° C. |
| Material for shaft | S55C quenched |
| Roughness of shaft | Rz not greater than 1.0 μm |

Examples 1 to 18 all exhibited higher fatigue resistance in relation to Comparative Examples 21 to 30. By virtue of addition of an inorganic compound, a liquid Bi phase remains in the Cu alloy powder particles until the Cu alloy powder particles are sufficiently sintered in the sintering step, thereby preventing Bi from flowing by its weight along the surface of the Cu alloy powder particle toward the lower portion of the Cu alloy layer, as described above. As a result, the average particle size of Bi phases of the Cu alloy layer becomes fine and the Bi phase becomes isotropic.

Examples 12 to 14 have a Bi phase, in the Cu alloy layer, having a further fine average particle size compared to Examples 1, 10 and 11, since the specific gravity of the inorganic compound is closer to the specific gravity of Bi, while the content of the Cu alloy and an amount of the inorganic compound are same. Thereby fatigue resistance is improved.

Examples 15 to 17 have a Cu alloy layer having higher strength and fatigue resistance compared to Example 1, by adding Sn to the Cu alloy layer while the average particle size and isotropic index of the Bi phase are almost the same as those of Example 1. However, it was confirmed from Example 17 that 5 mass % of Sn added to a Cu alloy layer increases the average particle size of the Bi phase and decreases the isotropic index by the aforementioned mechanism. From the results, it is presumed that the Sn content of 5 mass % is a maximum.

Example 18 have a Cu alloy layer having a higher strength and fatigue resistance compared to Example 1 by adding Ni, Fe, Ag and P to the Cu alloy layer while the average particle size and isotropic index of the Bi phase are almost the same as those of Example 1.

Comparative Example 21 has poor fatigue resistance in comparison with Example 1 although the average particle size of the Bi phase is small. This is because bonding strength between the Cu alloy layer and the steel strip is not sufficient due to low sintering temperature at 700° C. It is also because sufficient strength against vertical load cannot be obtained since Bi of Comparative Example 21 is in a flake form and not isotropic and the flake-form Bi phases are arranged such that the longitudinal axis thereof is in parallel to the sliding surface. Comparative Example 22 has large average particle size of the Bi phase of 19.67 μm, in comparison with Example 1. This is because sintering temperature is high at 850° C. and the Cu alloy powder particles are excessively sintered so that an effect of the mechanical alloying powder of reducing the size of the Bi phase process is not exerted.

Since Comparative Example 23 includes an inorganic compound having a large average particle size, less inorganic compound are embedded in the Bi phase on the surface of the Cu alloy powder particle during a powder mixing step. Thus, the effect of holding the Bi liquid phase on the surface of the Cu alloy powder particle until the Cu alloy powder particles are sufficiently sintered cannot be sufficiently obtained in a later sintering step. At this time, the liquid Bi phase flows by its weight along spaces between the Cu alloy powder particles toward the lower portion of the Cu alloy layer. Since the Bi flows merge with each other, the Bi phase in the Cu alloy layer becomes coarse and has elongated shape in the Y axis direction and not isotropic. As a result, fatigue resistance decreases.

Since a large amount of Bi is contained in Comparative Example 24, the Bi phase has a large average particle size and no isotropy. As a result, fatigue resistance decreases.

Since the amount of the inorganic compound is not sufficient in Comparative Example 25, the effect of suppressing coarsening of the Bi phase in the Cu alloy layer is insufficient and the Bi phase becomes coarse. As a result, fatigue resistance decreases.

Since a large amount of the inorganic compound is contained in Comparative Example 26, the inorganic compound is locally aggregated in the Cu alloy layer. As a result, fatigue resistance decreases although the particle size of the Bi phase in the Cu alloy layer is small and the Bi phase is isotropic.

Since the inorganic compound is not contained in Comparative Example 27, the liquid Bi phase cannot be held in the Cu alloy powder particles in the sintering step. As a result, the liquid Bi phase flows out from the surface of the Cu alloy powder particle before the Cu alloy powder particles are sintered sufficiently. At this time, the liquid Bi phase flows by its weight along spaces between the Cu alloy powder particles toward the lower portion of the Cu alloy layer, and thereafter, Bi flows merge with each other. Consequently, the Bi phase in the Cu alloy layer coarsens and the shape thereof is elongated along the Y axis direction and not isotropic. As a result, fatigue resistance decreases.

In Comparative Example 28, an inorganic compound having a small specific gravity in comparison with Bi is contained. In Comparative Example 29, an inorganic compound having a large specific gravity in comparison with that of Bi is contained. Therefore, the effect of suppressing coarsening of the Bi phase in the Cu alloy layer is insufficient, and thus the Bi phase coarsens. As a result, fatigue resistance decreases.

An inorganic compound having a slightly larger average particle size than the range of the invention is used and Sn is further contained in order to strengthen the Cu phase in Comparative Example 30. Therefore, less inorganic compound is embedded in the Bi phase on the surface of the Cu alloy powder particle in a mixing step, and the effect of holding the liquid Bi phase in the Cu alloy powder particle is insufficient in a later sintering step. Furthermore, since Sn is contained, a large amount of Cu—Sn liquid phase is generated and thus the Cu alloy powder easily flows. As a result, the liquid Bi phase flows out from the surface of the Cu alloy powder particle before the Cu alloy powder particles are sufficiently sintered. At this time, the liquid Bi phase flows by its weight along the spaces between the Cu alloy powder particles toward the lower portion of the Cu alloy layer and thereafter Bi flows merge with each other. Consequently, the Bi phase of the Cu alloy layer coarsens. The shape thereof is elongated along the Y axis direction and not isotropic. As a result, fatigue resistance decreases.

Copper-based sliding materials according to the embodiments of the invention are not limited to those for sliding bearings used in internal combustion engines and applicable to materials for sliding bearings for use in various industrial machines. Furthermore, the copper-based sliding materials according to the embodiments of the invention can be used also as multilayered bearings having an overlay layer on the Cu alloy layer.

The invention claimed is:

1. A copper-based sliding material comprising
a steel back-metal layer and a Cu alloy layer, the Cu alloy layer consisting of, by mass %,
greater than 10 to 30% of Bi particles,
0.5 to 5% of particles of an inorganic compound,
optionally 0.5 to 5% of Sn,
optionally at least one element selected from the group consisting of Ni, Fe, P and Ag in a total amount of 0.1 to 10%, and
the balance being Cu and inevitable impurities,
wherein the inorganic compound has an average particle size of 1 to 5 μm and a specific gravity of 70 to 130% relative to the specific gravity of Bi, and
wherein the Bi particles are in the Cu alloy layer in an average particle size of 2 to 15 μm, and the Bi phase is dispersed in the Cu alloy layer and isotropic
wherein an average value of x/y is 1 to 2 where x is an average length of the Bi particles in a x-axis direction and y is an average length of the Bi particles in a y-axis direction where the x-axis is taken in a thickness direction of the Cu alloy layer and the y-axis is perpendicular to the x-axis.

2. The copper-based sliding material according to claim 1, wherein the inorganic compound has a specific gravity of 90 to 110% relative to the specific gravity of Bi.

3. The copper-based sliding material according to claim 1, wherein the inorganic compound is a carbide, nitride or silicide of a metal.

4. A copper-based sliding material comprising a steel back-metal layer and a Cu alloy layer, the Cu alloy layer consisting of, by mass %,
greater than 10 to 30% of Bi particles,
0.5 to 5% of particles of an inorganic compound,
optionally 0.5 to 5% of Sn,
optionally at least one element selected from the group consisting of Ni, Fe, P and Ag in a total amount of 0.1 to 10%, and
the balance being Cu and inevitable impurities,
wherein the inorganic compound has an average particle size of 1 to 5 µm and a specific gravity of 70 to 130% relative to the specific gravity of Bi, and
wherein the Bi particles are in the Cu alloy layer in an average particle size of 2 to 15 µm, and the Bi phase is dispersed in the Cu alloy layer and isotropic
wherein an average value of x/y is 1 to 2 where x is an average length of the Bi particles in a x-axis direction and y is an average length of the Bi particles in a y-axis direction where the x-axis is taken in a thickness direction of the Cu alloy layer and the y-axis is perpendicular to the x-axis;
wherein the inorganic compound has a specific gravity of 90 to 110% relative to the specific gravity of Bi; and
wherein the inorganic compound is a carbide, nitride or silicide of a metal.

* * * * *